US012700015B2

(12) United States Patent
Cain

(10) Patent No.: US 12,700,015 B2
(45) Date of Patent: *Aug. 4, 2026

(54) SYSTEMS AND METHODS FOR DUAL PRICING

(71) Applicant: Jerry Cain, Las Vegas, NV (US)

(72) Inventor: Jerry Cain, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/908,600

(22) Filed: Oct. 7, 2024

(65) Prior Publication Data

US 2025/0029130 A1    Jan. 23, 2025

Related U.S. Application Data

(63) Continuation of application No. 17/166,782, filed on Feb. 3, 2021, now Pat. No. 12,112,346.

(Continued)

(51) Int. Cl.
*G06Q 30/0201* (2023.01)
*G06K 1/12* (2006.01)
(Continued)

(52) U.S. Cl.
CPC ......... *G06Q 30/0206* (2013.01); *G06K 1/121* (2013.01); *G06K 19/06028* (2013.01);
(Continued)

(58) Field of Classification Search
CPC ............. G06Q 30/0206; G06Q 20/202; G06Q 20/387; G06Q 20/405; G06Q 30/0185;
(Continued)

(56) References Cited

U.S. PATENT DOCUMENTS 8,328,083 B2 * 12/2012  Suk ........................ G06Q 20/20
235/383
8,788,341 B1    7/2014  Patel et al.
(Continued)

FOREIGN PATENT DOCUMENTS

WO    WO-0104852 A1 *  1/2001  ........... G06Q 20/202

OTHER PUBLICATIONS

"DuoPricelist ISOs & Resellers Marketing Brochure, published Jan. 1, 2021".
(Continued)

*Primary Examiner* — Sonji N Johnson
(74) *Attorney, Agent, or Firm* — Kutak Rock LLP; Ryan S. Hinderliter

(57) ABSTRACT

A system for and method of generating alternative pricing is provided. A user accesses an online portal to set a pricing scheme for products. The user inputs a credit card price for one or more products along with a desired cash discount rate or amount. The invention can then generate a second price for each product and check said prices for compliance against one or more rules and regulations set by credit card issuers, state governments, and/or federal governments. Some embodiments of the invention include notifying the user of non-compliance and automatically providing iterative pricing checks to find the best compliant price. The invention can also generate a reference or point-of-sale code which can be utilized by a consumer to view a final resulting price list.

18 Claims, 12 Drawing Sheets

Related U.S. Application Data

(60) Provisional application No. 62/970,641, filed on Feb. 5, 2020.

(51) Int. Cl.

| | |
|---|---|
| *G06K 19/06* | (2006.01) |
| *G06Q 20/20* | (2012.01) |
| *G06Q 20/38* | (2012.01) |
| *G06Q 20/40* | (2012.01) |
| *G06Q 30/018* | (2023.01) |
| *G06Q 30/0601* | (2023.01) |
| *G06K 7/14* | (2006.01) |

(52) U.S. Cl.
CPC ......... *G06Q 20/202* (2013.01); *G06Q 20/387* (2013.01); *G06Q 20/405* (2013.01); *G06Q 30/0185* (2013.01); *G06Q 30/0623* (2013.01); *G06K 7/1413* (2013.01)

(58) Field of Classification Search
CPC .. G06Q 30/0623; G06Q 20/201; G06K 1/121; G06K 19/06028; G06K 7/1413
See application file for complete search history.

(56) References Cited

U.S. PATENT DOCUMENTS

| | | | |
|---|---|---|---|
| 10,846,721 B2 | 11/2020 | Omer et al. | |
| 11,276,108 B2 | 3/2022 | Dworak | |
| 12,112,346 B2 * | 10/2024 | Cain | G06Q 20/202 |
| 2005/0139661 A1 * | 6/2005 | Eglen | G06Q 30/06 235/383 |
| 2007/0130090 A1 * | 6/2007 | Staib | G06Q 30/0222 705/14.69 |
| 2010/0250379 A1 * | 9/2010 | Giordano | G06Q 20/00 705/20 |
| 2011/0320248 A1 | 12/2011 | Gorelik et al. | |
| 2013/0138491 A1 | 5/2013 | Gao et al. | |
| 2015/0348130 A1 * | 12/2015 | Vierra | G06Q 30/0273 705/14.69 |
| 2017/0169670 A1 | 6/2017 | Murphy | |
| 2019/0370838 A1 * | 12/2019 | Vierra | G06Q 30/0206 |
| 2020/0226664 A1 | 7/2020 | Wang et al. | |
| 2021/0166314 A1 | 6/2021 | Klein et al. | |
| 2021/0241302 A1 | 8/2021 | Cain | |

OTHER PUBLICATIONS

"DuoPricelist MBNCARD Agents & Partners Marketing Brochure, published Jan. 1, 2021".
"DuoPricelist MBNCARD Merchants Marketing Brochure, published Jan. 1, 2021".
"How to Offer a Compliant Cash Discount Program Using DuoPricelist—Merchants Bancard Network, https//:merchantsbancard.com/how-to-offer-a-compliant-cash-discount-program-using-duopricelist/, published Jul. 20, 2020".

* cited by examiner

100

SYSTEMS AND METHODS FOR DUAL PRICING

CROSS-REFERENCE TO RELATED APPLICATIONS

This application is a continuation application of co-pending U.S. patent application Ser. No. 17/166,782, filed Feb. 3, 2021, soon to be U.S. Pat. No. 12,112,346, which claims priority pursuant to 35 U.S.C. § 119(e) to U.S. Provisional Patent Application Ser. No. 62/970,641, filed on Feb. 5, 2020, the entire disclosures of which are incorporated herein by reference.

FIELD OF THE INVENTION

The present invention relates generally to pricing for transactions. More specifically, the present invention is concerned with credit, debit, or other value-card transactions where the seller offers both credit card and cash pricing.

BACKGROUND OF THE INVENTION

Merchants that accept credit cards must pay interchange fees and discount fees on all credit-card transactions. Some merchants have opted to introduce a surcharge or checkout fee, which is an extra fee charged by a merchant when receiving a payment by cheque, credit card, charge card or debit card (but not cash) which at least covers the cost to the merchant of accepting that means of payment, such as the merchant service fee imposed by a credit card company.

A surcharge may be prohibited by card issuers, such as Visa and MasterCard, but the enforcement of the prohibition is not uniform. Some jurisdictions have laws which require, allow, regulate or prohibit a merchant imposing a surcharge. If no surcharge is permitted, the merchant's costs are borne by the merchant, who may incorporate the burden in its prices. In some cases merchants are barred by their credit agreements from passing these fees directly to credit card customers, or from setting a minimum transaction amount. The result is that merchants are induced to charge all customers (including those who do not use credit cards) higher prices to cover the fees on credit card transactions. The inducement can be strong because the merchant's fee is a percentage of the sale price, which has a disproportionate effect on the profitability of businesses that have predominantly credit card transactions, unless compensated for by raising prices generally.

In some jurisdictions, when a customer pays with cash, the merchant may offer a discount. The prices listed for all consumers are the same, credit-card based price. However, when the consumer resolves their payment in cash, a discount is applied.

Understandably, such pricing models and cash discounts quickly become an administrative burden on merchants who wish to offer consumers the lowest price possible on any given good or service while still complying with all card, state, and federal rules and regulations. Each credit card issuer may have different terms associated with pricing models allowed for merchants who utilize their cards for payment. Each state may have its own regulations on pricing models. Moreover, regulations and rules may differ based on the products being offered-one product may fall under a certain rule while another falls under a different rule.

Accordingly, there is a need for systems and methods for generating multiple pricing models based on merchant location, merchant inventory, state and/or federal rules, and card and/or merchant rules.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

In one aspect, the invention provides a method for generating at least two prices for each product of a plurality of products. In one embodiment, the method includes the steps of (a) setting a first pricing structure (i.e., price listing with the first price listed for each product of the plurality of products) in which each product is associated with a respective price, (b) setting a first price constraint, (c) setting a second price constraint, and (d) generating a second price structure.

In one embodiment, each of the first price constraint and the second price constraint is a rule promulgated by a bank or credit card company regarding how fees can and cannot be handled by a merchant at the point of sale.

In one embodiment, the first price structure, the first price constraint, and the second price constraint are used to generate the second price structure. Here, a discount rate or an upcharge rate is applied to the first pricing structure using a software application running on a distributed network with a remote server central processor unit.

In one embodiment, the first pricing structure includes the standard price for each product and the second pricing structure includes at least both the standard price and the second price for each product of the plurality of products.

In another aspect, the invention provides a distributed network system for generating two prices for a product. In one embodiment, the system includes (a) a central processing unit (CPU) housing (i) a database containing price information for each product of a plurality of products, and (ii) a software application containing a computational algorithm that calculates a second price for each product of said plurality of products; (b) a first user interface device, a second user interface device, and optionally, a third user interface device; (c) a printer; (d) a product label; and (e) a point of sale (POS) device. Here, the price listing includes at least both the standard price and the second price for the product, and the barcode can be scanned by a customer to access the pricing information for the product.

In one embodiment, the CPU is located on a cloud-based server, and the user interfaces and the CPU are linked together via a data transmission medium, such as a telecommunication circuit, an ethernet circuit, wireless fidelity (WiFi), a microwave circuit, ultrahigh frequency (UHF) radio, and/or the like. In one embodiment, the CPU and the user interface devices mutually communicate over any one or more of a wide area network (WAN), an internet, a cloud internet area network (IAN), a metropolitan area network (MAN), a local area network (LAN), and/or the like.

In one embodiment, the first user is a system administrator, the second user is a merchant, and the third user is a customer. Here, the user interfaces can be any one of a smart phone, a smart watch, a desktop computer, a laptop computer, a tablet device, and/or the like.

DETAILED DESCRIPTION

Figure 1:
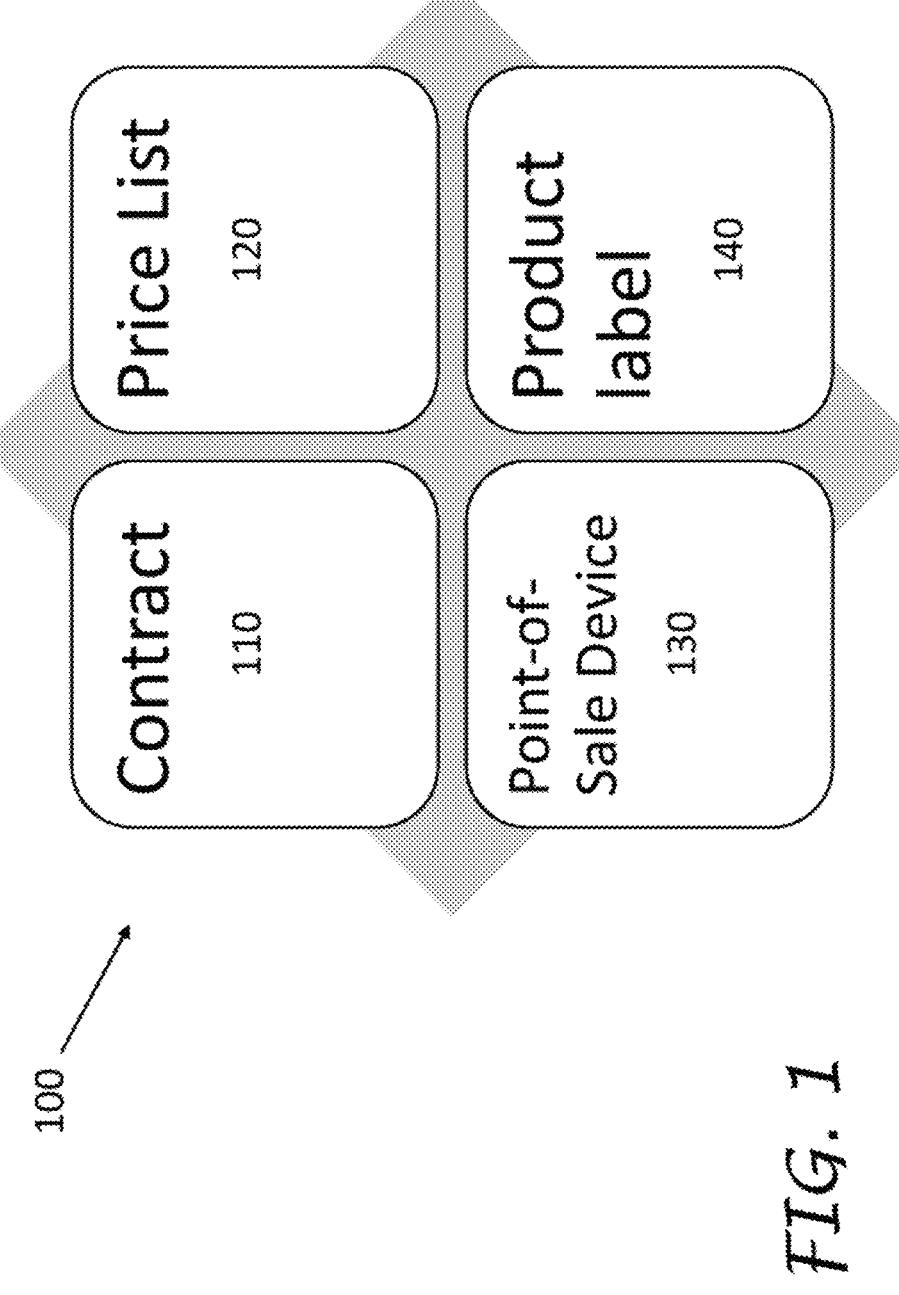
FIG. 1 is a relationship graphic depicting device elements of a dual pricing system.

Embodiments of the present invention relate to systems and methods for generating alternative pricing. By way of example, various embodiments of the present invention provide systems and methods for generating credit, debit, or other card pricing along with cash pricing. This dual-price structure can be generated and accessed in a number of ways.

In one such embodiment, the systems and methods provide an application that allows a merchant to enter, upload, or import cash and/or card prices for one or more goods or services. These prices are stored as a first price structure. The application can take the form of a web page or an application running on a computer or other mobile device.

Second, the systems and methods can generate a second price structure using the first price structure. The second price structure, for example, can be generated using the card rules applicable to one or more of the merchants, the merchant location, and the card used. In addition, or in the alternative, the second price structure can be generated from the first price structure using discounts and/or surcharges. These discounts can be cash discounts, while at other times the discounts can be another form of discount. The surcharges can be credit card surcharges. In some instances, the discounts and surcharges are similar from product to product, while in other instances the discounts and surcharges vary from product to product.

Throughout this specification the phrase "product(s)" is used for convenience and refers to products and/or services.

In some embodiments, products can also be classified by type. By way of example, there can be a list of rules associated with each type. Those type rules can be used to generate the second price structure. Because of applying the applicable rules, the second price structure can include the cash and card prices applicable to a particular merchant transaction.

Third, the systems and methods of the present invention can generate a URL or other electronic link such as a QR code to the second price structure. A customer can use the electronic link to access the second price structure and thereby retrieve the applicable cash and card pricing for a particular product. This is advantageous for a number of reasons including that it allows a convenient way for a merchant to provide dual pricing for a potential transaction without having to post dual prices for each item offered for sale.

In further embodiments of the systems and methods of the present invention the merchant can create a profile. The merchant can provide one or more pieces of information pertinent to their business such as merchant type, merchant location, merchant products/services, merchant items, and other information typical of a merchant. Information in the profile can also be associated with one or more price structures.

In some embodiments, the systems and methods include setting one or more pricing constraints such as servicing fees, discount rates, pricing adjustments, and/or pricing limits.

Generation of Pricing Tables

Further embodiments of the present invention can generate one or more price tables. A price table can include a first pricing structure. In some embodiments, said first pricing structure can comprise user-inputs including credit-card prices associated with one or more products. In some instances, the user can be a merchant and the product(s) are offered for sale by that merchant.

Further embodiments can generate a second price structure. The second price structure can be generated using data from a first pricing structure. The second price structure can include pricing data associated with one or products. In some instances, the products are the same as or similar to the products referenced in a first price structure. The second price structure can also include cash or otherwise discounted prices associated with the products. In further embodiments, the second price structure can be generated using one of a first price structure and at least one pricing constraint or pricing rule.

Checking Compliance of Pricing Tables Against Regulations

In some embodiments, the systems and methods of the present invention can verify one or more price structures, for example, by comparing a price structure against one or more governmental and/or merchant rules or regulations. By way of example, a price structure can comprise cash and card prices for one or more products. In such embodiments, each price can be verified by comparing it against one or more rules or regulations. Verification succeeds if every price in a price structure is compliant with the applicable rules, while in other embodiments not all prices need to be compliant for verification to succeed. In some embodiments, an entire price table is checked for compliance, while in other embodiments only part of a price table is checked. For example, in some embodiments, partial compliance of a price structure is given, where some prices within the structure comply and others do not.

In some embodiments, the rules and/or regulations are set by private companies, such as credit card issuers, while in other embodiments the rules and/or regulations are set by a governmental entity, such as a state or federal government. In yet other embodiments, the rules and regulations are created by both between private and governmental entities.

Warning User of Non-Compliant Price Results.

In some embodiments of the present invention, the user can be notified of verification results. For example, where the verification determines compliance, no notification may be given, while in others notification is given for compliant results. In further embodiments, the user can be notified of non-results and can be prompted to change one or more constraints, such as the type or amount of discount applied to one or more products. Further, once the user changes one or more constraints, another price structure can be generated. When a new price structure is generated, the invention can verify the structure again to ensure compliance with the applicable rules. This process loop can be continued until all price structures for a given merchant or product are compliant with the applicable rules.

Automatically Fixing Non-Compliant Price Results and Prompting User to Agree.

In some embodiments, the systems and methods of the present invention can automatically modify one or more price structures to comply with one or more rules or regulations. In some instances, this corrective process requires input form the user, while in other embodiments no user input is required. In some embodiments, the method includes modifying one or more pricing structures iteratively. In some embodiments, instead of modifying a price structure, a new price structure can be generated iteratively. In some embodiments, if a first generated price structure is not fully compliant, a second one is generated off the closeness of compliance of the first. If the second pricing structure is not compliant, then a third can be generated, and so on and so forth. In this way, many complex rules and regulations can be complied to without sacrificing the integrity of the price structure as a whole and can provide the lowest possible pricing on each product for potential customers.

In some embodiments, the present invention can generate a final pricing chart that can include one or more products with at least one relating price. In some embodiments, each product can include a first price and a second price, wherein the first price can be a credit card price and the second price can be a rule-compliant discounted price.

Generating Point-of-Sale Reference to Point Consumer to Pricing Chart

In some embodiments, the systems and methods of the present invention can generate a reference to a resulting pricing chart. The reference can be transferred to or represented on physical media, such as printed or displayed on paper, plastic, or another item. The reference can be a URL, a QR code, a hashtag, keyword or phrase, or similar reference. The invention can then direct a consumer to the reference to view one or more price structures. In this way, a consumer can be directed to an application or website which shows both card price and cash discount price, while the merchant is confident that the consumer is viewing the lowest compliant prices that can be offered while still being in compliance with the applicable rules.

Specific Embodiments

Turning to FIG. 1, in one aspect, the invention provides a system 100 that enables the pricing of products for sale to have two or more prices. Here, the system 100 includes a contract 110, a price list 120, physical product label 130, and a point-of-sale device 140. In a specific embodiment, the system 100 is a web-based system or other distributed network system that provides for an electronic contract 140 that may be executed, authorized, or signed electronically. In a specific embodiment, the electronic contract 140 may be authorized using a software program or service such as, e.g., a DOCUSIGN electronic document authorization application. Here, the system administrator is one party to the contract 110 and the merchant seller of products is the other party to the contract 110.

In one embodiment, the price list 120 is a printed or electronic (e.g., housed in a database in the memory of a central processing unit (CPU) and accessed by a user interface in communication with the CPU) list containing the price of two or more products. Here, the price list 120 provides at least two prices for each product, a lower or discounted price, and a higher or undiscounted price in addition to the name or other identifier of the product.

In one embodiment, the product label 130 includes a physical tag, placard, catalog, shelf label or other label, store catalog or circular, advertisement, product menu board, printed paper, or plastic label, adhered to, displayed proximate to, or otherwise attached to the relevant product, and/or the like. Here, the product label includes in print the discounted price, which is a specific embodiment is the cash price, and the undiscounted price, which in a specific embodiment is the credit card or other merchant-cost-incurring method of payment. In another embodiment, the product label contains printed information in the form of a barcode, matrix barcode (i.e., quick response (QR) code), Hypertext Transfer Protocol (http) address, or the like. Here, the customer can scan the barcode or input the http address with their interface device (e.g., smart phone, smart watch, etc.). In still another embodiment, the product label contains an RFID or like device for linking and presenting the product price information on a consumer's interface device.

Figure 2B:
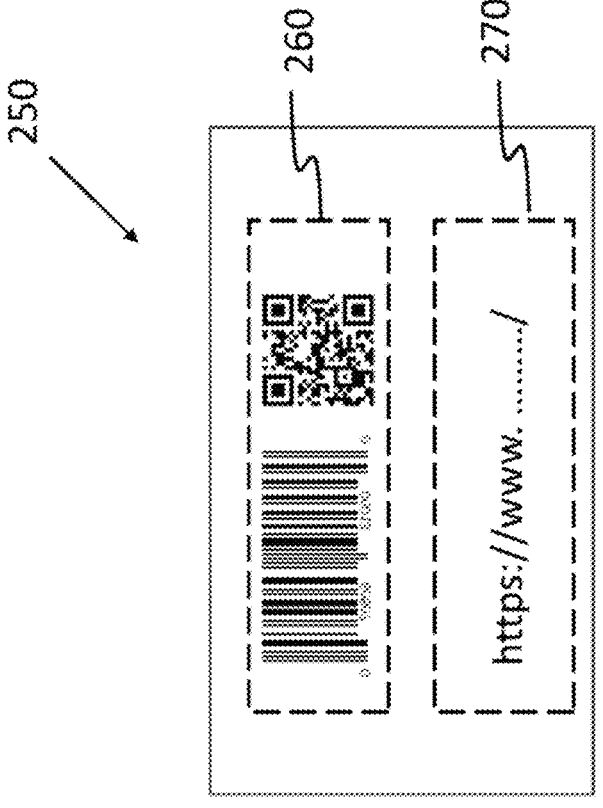
FIG. 2B is a cartoon depicting an exemplar printed product label with a barcode and URL address.
Figure 2A:
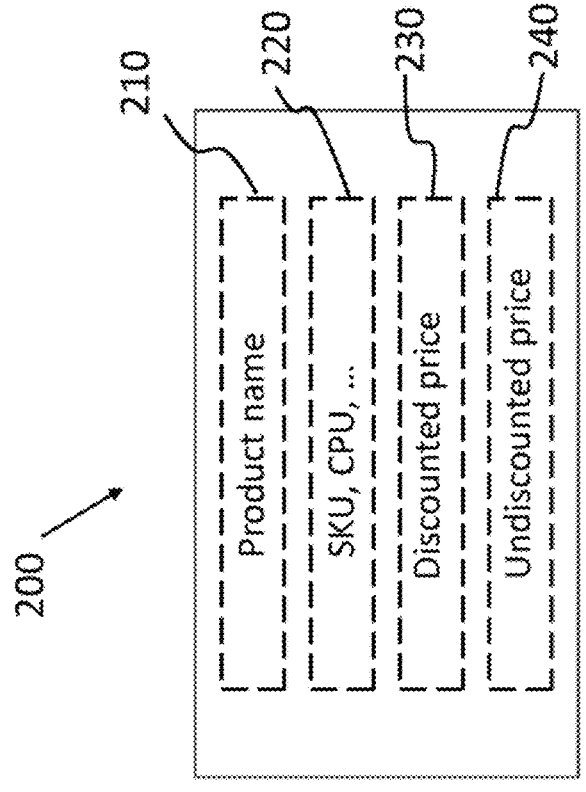
FIG. 2A is a cartoon depicting an exemplary printed product label with two prices indicated for a product.

Turning to FIG. 2A, in one embodiment, the product label 200 is a label including printed information directed to the product name 210, optionally a numeric or alphanumeric product identifier 220 such as, e.g., a stock keeping unit (SKU), universal product code (CPU), or other proprietary product identifier, the discounted (e.g., cash) price 230, and the undiscounted (e.g., credit card) price 240.

Turning to FIG. 2B, in another embodiment, the product label 250 is a label including printed information directed to a barcode 260, such as a QR code or a global standard 1 (GS1) barcode, such as a SKU barcode, EAN-B barcode, a UPC-A barcode, and EAN-8 barcode, a UPC-E barcode, or the like; and, optionally, an http web address 270. Here, the http web address and/or the barcode are uploaded by the customer into customer's device, such as a smart phone, smart watch, tablet, or the like, the barcode or web address then accesses the merchant's pricing information, which is housed in a database on a server hosting the merchant's internet or intranet site for consumer viewing. The merchant pricing information, which contains at least the product name, the discounted price, and the undiscounted price, is displayed on the interface of the customer's device.

Turning back to FIG. 1, the selected product is tendered at the point of sale device 140. The merchant or customer selects which of the discounted or undiscounted price is to be paid for the product, the product is exchanged for the payment and the transaction is completed at the point of sale device 140. Here, the point of sale device can be any device such as mechanical cash register, electronic point of sale device, calculator, written cash receipt pad, barcode reader, payment terminal, tablet or smart phone-based device, and the like.

Figure 3:
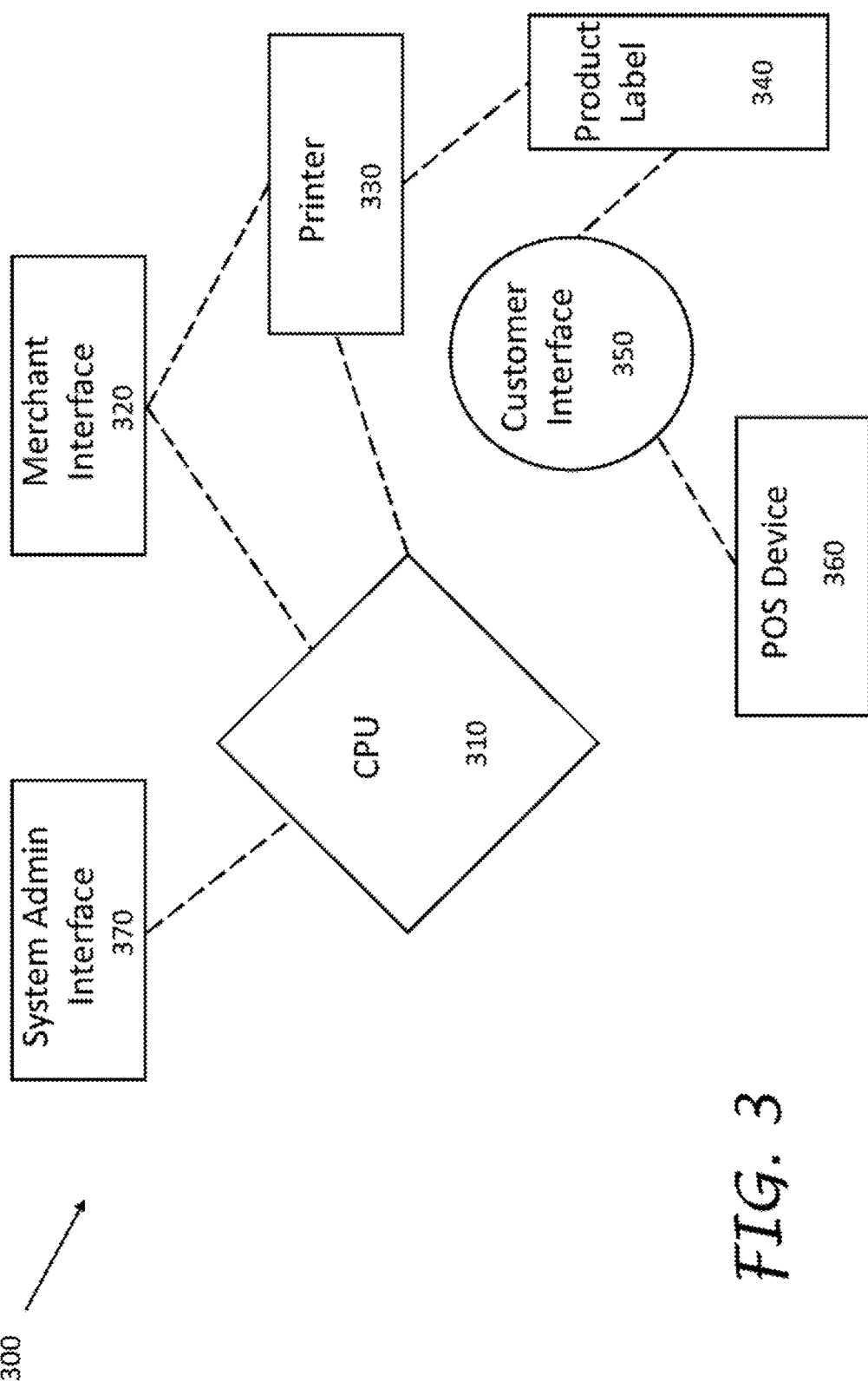
FIG. 3 is a relationship graphic depicting device elements of a dual pricing system.

Turning to FIG. 3, in one aspect, the invention provides a system 300 for assigning at least two prices to each of a plurality of products for sale by a merchant to a customer. In one embodiment, the system 300 includes a CPU 310, a merchant interface 320, a printer 330, a plurality of product labels 340, a customer interface 350, a point-of-sale device 360, and a system administrator interface 370. Here, the CPU 310 can be inter alia a server located at merchant's site, at the system administrator's site, or at a remote cloud site (i.e., a cloud-based server), such as an IaaS or PaaS, such as, e.g., MICROSOFT AZURE, AMAZON WEB SERVICES, IBM CLOUD, GOOGLE CLOUD PLATFORM, ORACLE CLOUD, VM WARE, VERIZON CLOUD, DIGITAL OCEAN, and the like. The CPU 310 hosts the software required to run the system 300 and perform the necessary computations to generate the discount and undiscounted price for each product. The CPU 310 communicates with each of the system administrator interface 370 and the merchant interface 320 over a wide area network (WAN) (or cloud lAN, internet, metropolitan area network, and the like) using telecommunication circuits, ethernet, wireless fidelity (WiFi), and/or UHF radio. Both the system administrator interface 370 and the merchant interface 320 may include a graphical user interface and a central processor unit running software to upload information from (or download information to) the CPU 310. For example, the merchant and/or system administrator interface 320/370 can be a computer, tablet, laptop, smart phone, or the like.

Here, the CPU 310 runs the software required to execute the algorithms necessary to intake the price and product lists from the merchant, handle the database of merchant product information, calculate the dual price for each product, and produce the virtual price sheets to be printed as individual product labels. In one embodiment, the software determines the discounted price and the undiscounted price for each product by running an algorithm to calculate those prices.

For example, to calculate the undiscounted price of a product, the software applies the input upcharge rate to the standard price using an upcharge application that includes a computational algorithm that employs an equation such as Eq. 1. Here, the undiscounted price is the price charged for the product when it is purchased using a credit card, charge card, debit card, or like means that require the merchant to pay processing fees or incur a cost associated with using a credit card, charge card, debit card, and the like. Here, the standard price is the price charged for the product when purchased using cash or other means that do not require additional processing fees to be paid by the merchant.

$$y = x \cdot (1 + r) \qquad \text{Eq. 1}$$

where y is the undiscounted price, x is the standard price, and r is the percent upcharge rate.

For example, if the standard price (x) for the product is $4.67, the upcharge rate (r) is 4%, then the undiscounted price for the product is $4.67 times (1+0.04)=$4.88.

To calculate the discounted price of a product, the software applies the input discount rate to the standard price using a discounting application that includes a computational algorithm that employs an equation such as Eq. 2. Here, the discounted price is the price charged for the product when purchased using cash or other means that do not require additional processing fees to be paid by the merchant. Here, the standard price is the price of the product when it is purchased using a credit card, charge card, debit card, or like means that require the merchant to pay processing fees or incur a cost associated with using a credit card, charge card, debit card, and the like.

$$a = b \div (1 + d) \qquad \text{Eq. 2}$$

where a is the discounted price, b is the standard price, and d is the percent discount rate.

For example, if the standard price (b) for the product is $17.42, the discount rate (d) is 4.5%, then the undiscounted price for the product is $17.42 divided by (1+0.045)=$16.67.

In one embodiment, the software that performs the calculation, and manages the database and information exchange with the system administrator interface 370 and the merchant interface 320 is written in any coding language, such as, e.g., a server side scripting language. like Hypertext Pre-processor (PHP), JAVA, C sharp (C#), Python, and the like.

Here also, the CPU 310 houses in its memory a database that stores any one or more of merchant price sheets, price lists, inventory lists and information, product sourcing information, wholesale price information, credit card provider contract information, discount rates, upcharge rates, customer information, product information (including any one or more of, e.g., prices, custom discount or upcharge rate, PPUs, SKUs, product name, product photos, and the like), and the like.

The database is structured to facilitate the storage, retrieval, modification, and deletion of data in conjunction with the data-processing operation of the CPU 310. The database may be in any useful form, such as, e.g., a hierarchical database, a network database, an object-oriented database, a relational database, a NoSQL database, and the like.

In one embodiment, the database includes the structured database and a database management system that is run on the CPU 310. Here, the database/database management system may be any useful system, such as, e.g., POSTGRESQL, IBM DB2, SQLITE, MYSQL, MARIADB, MONGODB, AMAZON RELATIONAL DATABASE, ALTIBASE, ORACLE DATABASE, MICROSOFT SQL, FILEMAKER PRO, and the like database/database management systems.

In one embodiment, the merchant interface 320 device communicates with a printer 330. Here, the printer 330 prints a price list in a format that facilitates separation of individual product labels 340, as described for example in FIG. 2. A given print format or template is selected at the merchant device 320 and the price list populates the formatted price sheet from which the product labels are separated. For example, and for the sake of clarity, in one embodiment, the price sheet template may be any one of a number of templates designed to fit commercial label sheets, such as, e.g., Avery labels. Here, e.g., the printer 330 prints the formatted price sheet onto an Avery label sheet such that individual product labels, e.g., price tags, are printed in each demarcated removable label.

The system 310 includes a customer interface 350 capable of scanning the barcode 260 of a product label 340, or capable of receiving customer instructions to visit a web address 270 that provides product price and other information. Here, the customer interface 350 can be any one of a cell phone, a smart phone, a smart watch, a tablet computer, a laptop computer, a barcode scanner, a digital camera, and the like.

The system 310 includes a point-of-sale (POS) device 360 where the purchase of the product at the selected price (discounted or undiscounted) is transacted. The POS device may be any device useful for carrying out a financial transaction, such as, e.g., mechanical cash register, electronic point of sale device, calculator, written cash receipt pad, barcode reader, payment terminal, tablet or smart phone-based device, and the like.

Figure 4:
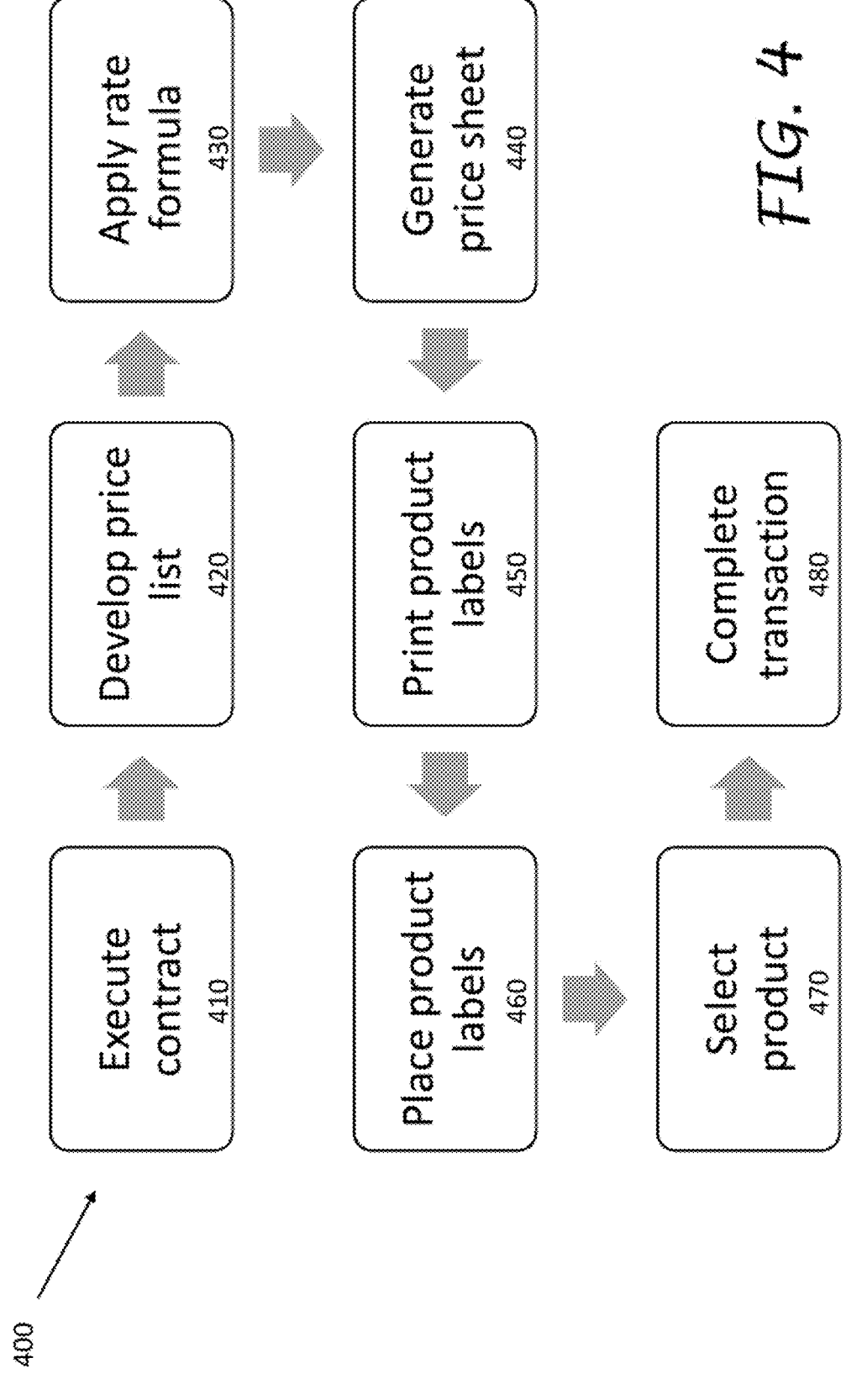
FIG. 4 is a flow chart depicting the steps in a method for assigning dual pricing to products.

Turning to FIG. 4, in one aspect, the invention provides a method for applying at least two prices, a discounted price and an undiscounted price, to each product of a plurality of products. The method 400 includes the steps of executing a contract 410, developing a price list 420, applying a discount or upcharge rate to the price list 430, generating a price sheet 440, printing the product labels 450, applying the product labels to the products 460, selecting a product 470, and exchanging money for the product 480.

In one embodiment, the contract is executed 410 between a merchant who sells the products to a customer, and a system administrator who hosts and maintains the system upon which the method 400 is operated. In one embodiment, the contract is reviewed, negotiated, and executed electronically. Here, for example, the final contract is executed by applying electronic signatures, such as via DOCUSIGN, PANDADOC, E-SIGNATURES BY ADOBE SIGN, HELLOSIGN, and the like.

A price list is developed 420 by the merchant. The price list contains the product names, alphanumeric or numeric product-identifying codes, and the discounted price of each product. In one embodiment, an upcharge rate is applied 430 to each product on the price list. Here, the CPU-based software calculates the undiscounted rate according to Equation 1. The undiscounted (up charged) price for each product is then applied to the price list. A price sheet containing both the discounted price and the undiscounted price is then generated 440 by the system software.

The product label for each product is then printed 450 based upon the price sheet. In one embodiment, the price sheet is formatted into a template selected within the system to be printed onto ready-made label paper with sticky backs. Here, for example, the templates can be custom made and imported into the system, or they can be commercial templates for commercially available labels, such as, e.g., AVERY, VISTAPRINT, MICROSOFT TEMPLATES, and the like.

The product labels, which contain printed information, e.g., any one or more of product name, alphanumeric identifier, discounted price, undiscounted price, barcode (which includes matric type or QR code), and http web address to merchant site with product information), are applied 460 to each product.

Figure 5:
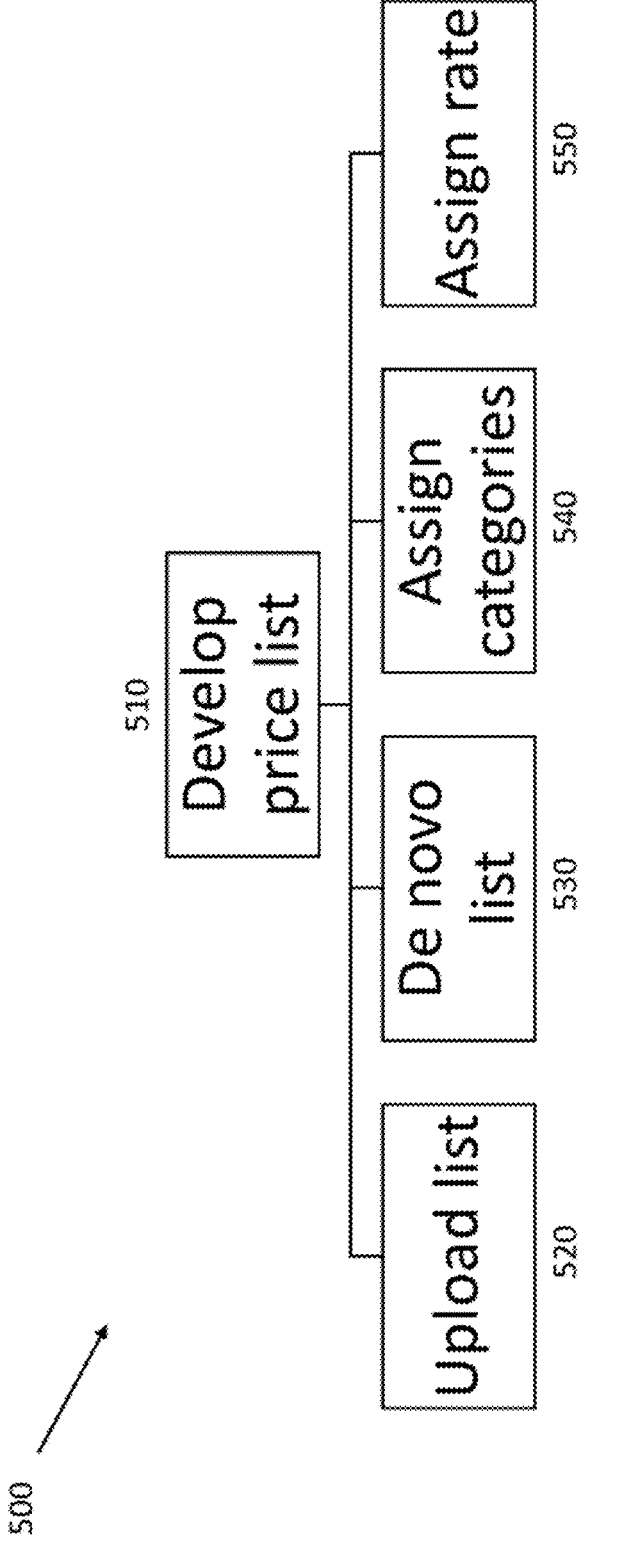
FIG. 5 is a hierarchy chart depicting steps for developing a product price list.

Turing to FIG. 5, in one embodiment, the price list is developed 510 by either uploading a pre-made price list 520 into the distributed network system via the merchant interface, or by entering the product information de novo 530 into a graphical user interface displayed on the merchant's interface device, preferably via a dialog box display (see e.g., FIG. 7) to create a price list. Here, the merchant assigns each product to a category 540, such as, e.g., shoes, lamps, hardware, flatware, and the like, wherein the category designation may represent a field identifier associated with the product in the database to enable product sorting and customized price lists and sheets.

Here also, the merchant applies the discount or upcharge rate to the product or product category. In some embodiments, the discount or upcharge rate is preloaded into the system software by the system administrator. In that case, if the merchant wishes to change the rate or assign a different rate to a different product or category of products, the merchant requests the system administrator to make the change. In other cases, the merchant can directly input or change the discount or upcharge rate into the system. In a specific embodiment, the system has a default rate the coincides with the fees charged by credit card companies for processing credit card transactions, such as, e.g., 4%.

Turning back to FIG. 4, a customer, preferably while in a brick-and-mortar space controlled by the merchant, identifies a product of interest and observes the printed label to ascertain the discounted price and the undiscounted price. In one embodiment, the product label includes a barcode and/or a printed uniform resource locator (URL) (http web address). Here, the customer scans the barcode with their camera-enabled handheld device (i.e., the customer interface) or enters the URL address into the browser of the handheld device, accessing the merchant's internet or intranet site, displaying the undiscounted and discounted price of the product of interest.

After selecting the product 470 and ascertaining the price (discounted cash price and the undiscounted credit card price), the customer completes the transaction 480 with the merchant. Here, the customer tenders, to the merchant, cash at the discounted price listed for the product, or alternatively tenders payment in the form of a credit card or the like at the undiscounted price listed for the product.

Figure 6:
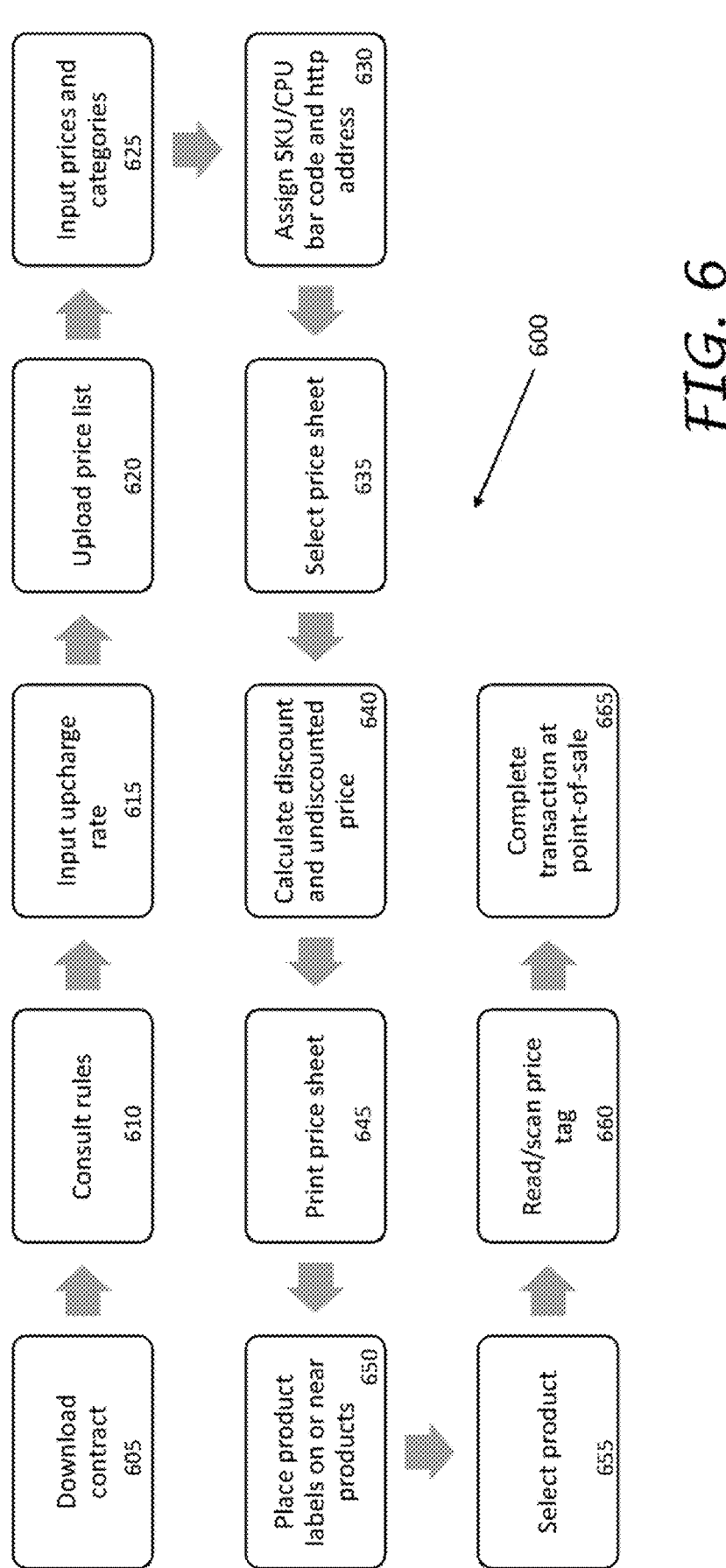
FIG. 6 is a flow chart depicting the steps in a method for assigning dual pricing to products.

Turning to FIG. 6, in one aspect, the invention provides a method of applying at least two prices, a discounted price and an undiscounted price, to each product of a plurality of products for sale by a merchant to a consumer such that the merchant can recover fee expenses for accommodating fee-laden payment methods, such as credit card or other like payments by the customer. In one embodiment, the method includes the steps of the merchant downloading a contract in an electronic form from the system administrator 605; the merchant or system administrator consulting government, bank, credit card issuer, or credit card network statutes, rules, or guidelines related to how fees associated with certain forms of payment may be collected by a merchant from a customer 610; determining the rate which a fee is charged by the bank, credit card issuer, or credit card network to the merchant for processing payments via the bank, credit card issuer, or credit card network (i.e., the upcharge fee), and then inputting the upcharge fee into the computer system upon which the method is performed 615; either the merchant uploads into the electronic system a price sheet that includes product name and/or description, alphanumeric or numeric identifier, and cash price for the product (e.g., a csv table or the like), and optionally a category for each product 620, or the merchant inputs product name, and/or description, alphanumeric or numeric identifier, and cash price for the product, and optionally a category for each product into a graphical user interface of the system presented on the merchant interface 625, thereby creating de novo a price list directly on the system as exemplified at FIG. 7; optionally, the merchant assigns, at step 620 or step 625, a SKU/CPR barcode and/or URL web address (e.g., http://www.xyz . . . ) to each product such that the barcode and URL links the customer to an internet or intranet page that provides relevant product information, including the undiscounted (i.e., up-charged) and the discounted price to be paid for the product 630; the merchant selects a relevant price sheet that reflects a price list or a category-based price list at the GUI of the merchant interface, such as via a drop down menu or the like, 635; the merchant applies the discount/upcharge rate to the price list or selected price sheet, or the system automatically applies a preselected discount/upcharge rate to the price list or selected price sheet 640, and the system calculates the discounted and undiscounted price for each product and applies that to the price sheet or price list 640; the merchant selects a template format on which to print the price sheet (e.g., an AVERY label template or the like), or the template is pre-selected, and the merchant prints the selected price according to the template 645; the merchant separates individual product labels from the printed price sheet (e.g., in the case of an AVERY-type label sheet, the individual product label is peeled from the backing paper) and applies the product labels, e.g., price tags, to the relevant product 650. Then, the customer in the merchant's shop selects a product of interest 655; reads the product label or scans the barcode, or enters the URL into their interface device to determine the discounted and undiscounted (up-charged) price to be paid for the product 660; then the customer tenders either cash for the discounted price, or a credit card (or other means requiring the merchant to pay a fee) for the undiscounted price to the merchant in exchange for the product, thereby completing the transaction at the point of sale 665.

In one exemplary embodiment, the consulted rules 610 are similar to identical to some rules promulgated by a credit card network such as VISA. For example, Visa has received an increasing number of questions in relation to discount offers, or what are commonly called "cash discounts." While there are many different programs being offered to merchants by their processors or agents, the VISA rules on discount offers may be consulted when considering whether a dual price/discount program is useful or applicable to the merchant.

For example, VISA's discount offer rule (ID #: 0008590) states that while merchants may request or encourage a cardholder to use a means of payment other than a VISA card, the method for doing so must be permitted under the VISA rules, such as offering a discount from the merchant's list, stated or standard price, among other possible incentives.

An example of a merchant segment that properly implements this model is automotive fuel merchants. Oftentimes there is signage at fuel merchants that clearly displays the credit price next to the discounted cash or debit price. It is important to note that the discount is taken from the regular price of the fuel and does not constitute any additional fee or surcharge that is removed when the customer pays with cash or a debit card.

For example, some models that encourage merchants to add a fee on top of the normal price of the items being purchased, then give an immediate discount of that fee at the register if the customer pays with cash or debit card, may not comply with the VISA rules and may subject the acquirer to non-compliance action. To maintain a level playing field for all participants of the payment system, VISA actively enforces its rules pertaining to cash discount programs. In this particular example, the merchant, at step 610, proactively monitors the discount programs offered by their credit processors or agents to ensure that the programs do not violate the VISA rules. Here, where the rules proscribe removing an additional fee at the point of sale, the regular price for the product equates to the "undiscounted" price, and the discounted price is taken from said regular price, i.e., the rate is a discount rate applied to the regular price as exemplified at Equation 2 (Eq. 2).

Turning to FIGS. 7, in one aspect, the electronic system for providing an undiscounted price and a discounted price for a product includes graphical user interface pages displayed at the merchant interface.

Figure 7A:
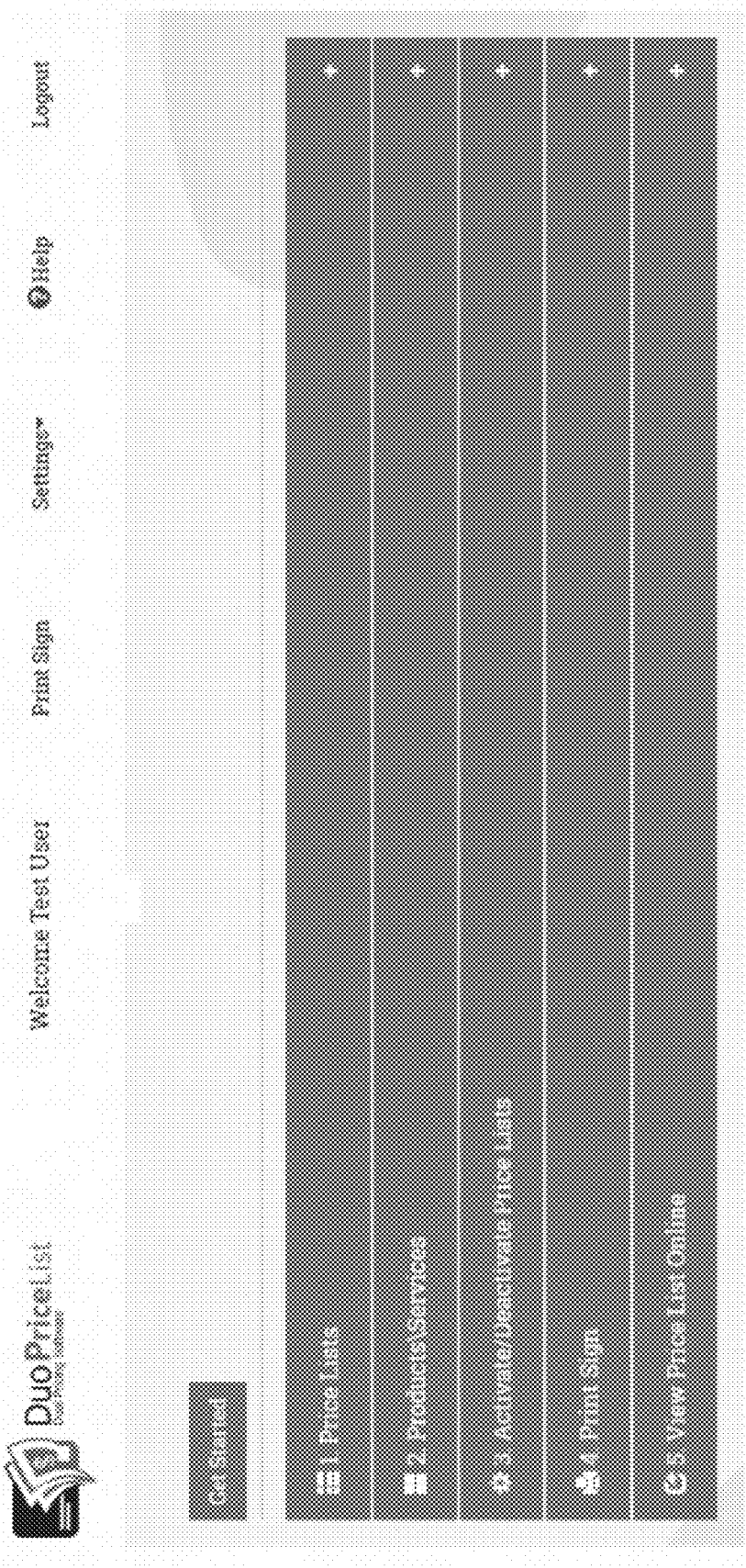
FIG. 7A is a screen shot depicting elements of a graphical user interface of a dual pricing system.

Here, FIG. 7A present a first page providing dropdown menus or dialog boxes for (1) selecting, adding, or editing a price list; (2) viewing, adding or editing products or services in a price list; (3) activating or deactivating a price list; (4) printing or authorizing a price list or price sheet; and (5) viewing a virtual online copy of a price list.

Figure 7B:
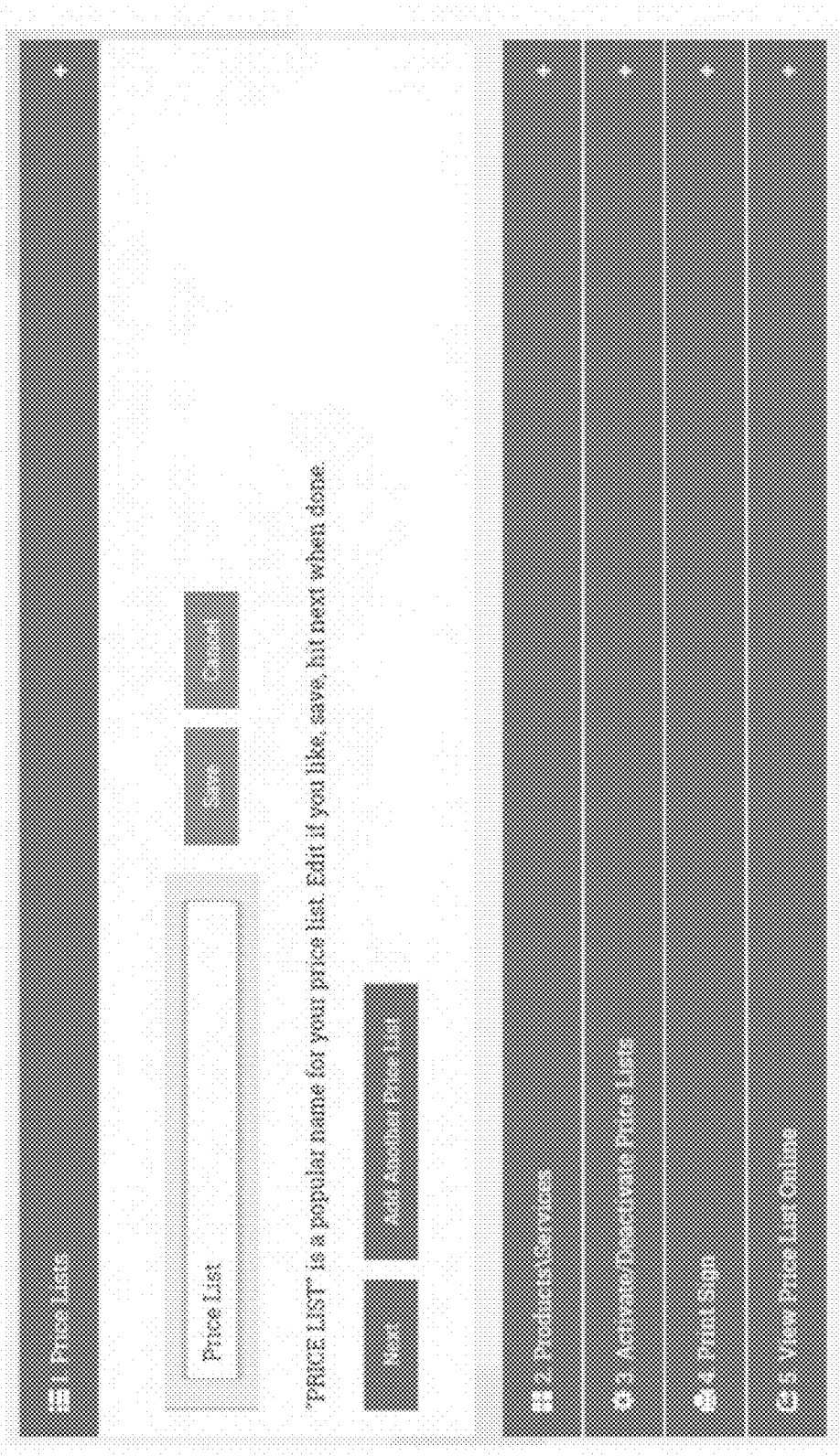
FIG. 7B is a screen shot depicting a price list window with other elements of a graphical user interface of a dual pricing system.

The first menu item (1) is depicted at FIG. 7B. In one embodiment, the GUI for the selecting, adding, or editing a price list includes a dialog box indicating the price list by name enabling the user to edit or otherwise change the name of the price list, a "save" button for saving the name of the price list, a "cancel" button for canceling the editing, a "next" button for toggling to the next price list, and an "add another price list" button for entering a new price list to the cache of price lists.

Figure 7C:
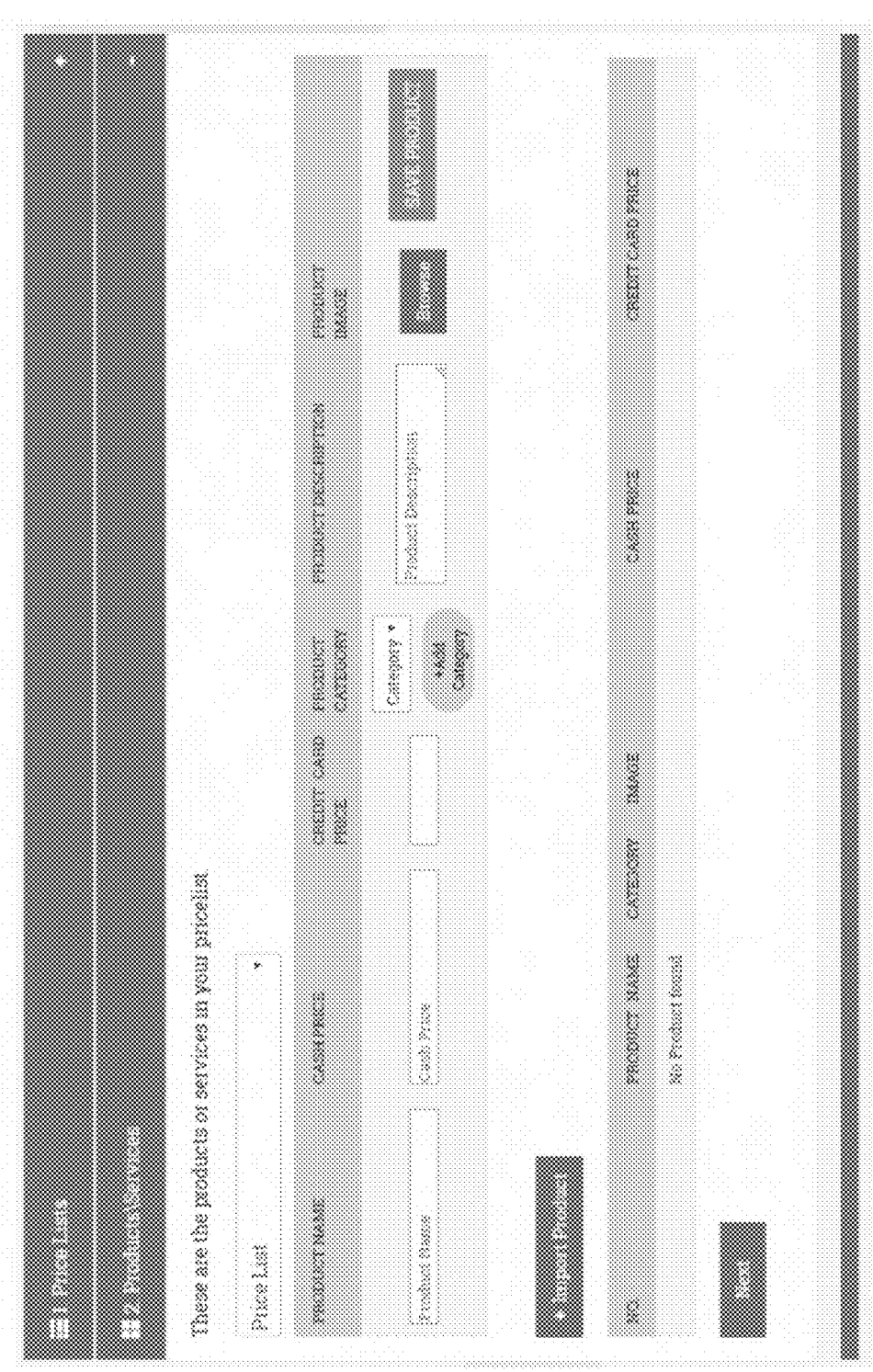
FIG. 7C is a screen shot depicting a display of a product and its price, image, and description with other elements of a graphical user interface of a dual pricing system.

The second menu item (2) is depicted at FIG. 7C. In one embodiment, the GUI for the viewing, adding or editing products or services in a price list includes a dropdown dialog box for selecting a price list; a "product name" window for viewing or editing the name of the current product in view; a "cash price window" for viewing or editing the cash price (discounted price) of the current product in view; a "credit card price" window for viewing or editing the credit card price (regular price) of the current product in view; a dropdown menu "category" window for selecting or viewing the category that the current in view product belongs; an "add category" button to enable adding a new category to the price list and enabling the assignment of the product to that newly created category; a "product description" window for viewing or editing the description of the product, including the numeric or alphanumeric identifier; a "browse" button for browsing and viewing, selecting, or editing the product image; and a "save product" button for saving the product and its associated information. Here also, the GUI includes an "import product" button for enabling the merchant or system administrator to upload an additional product into the price list, and one or more windows to enable entering the additional product name, category, image, cash (discounted) price, and credit card (regular) price. The GUI also includes a "next" button to enable the user to advance to the next screen (3) of the GUI.

Figure 7D:
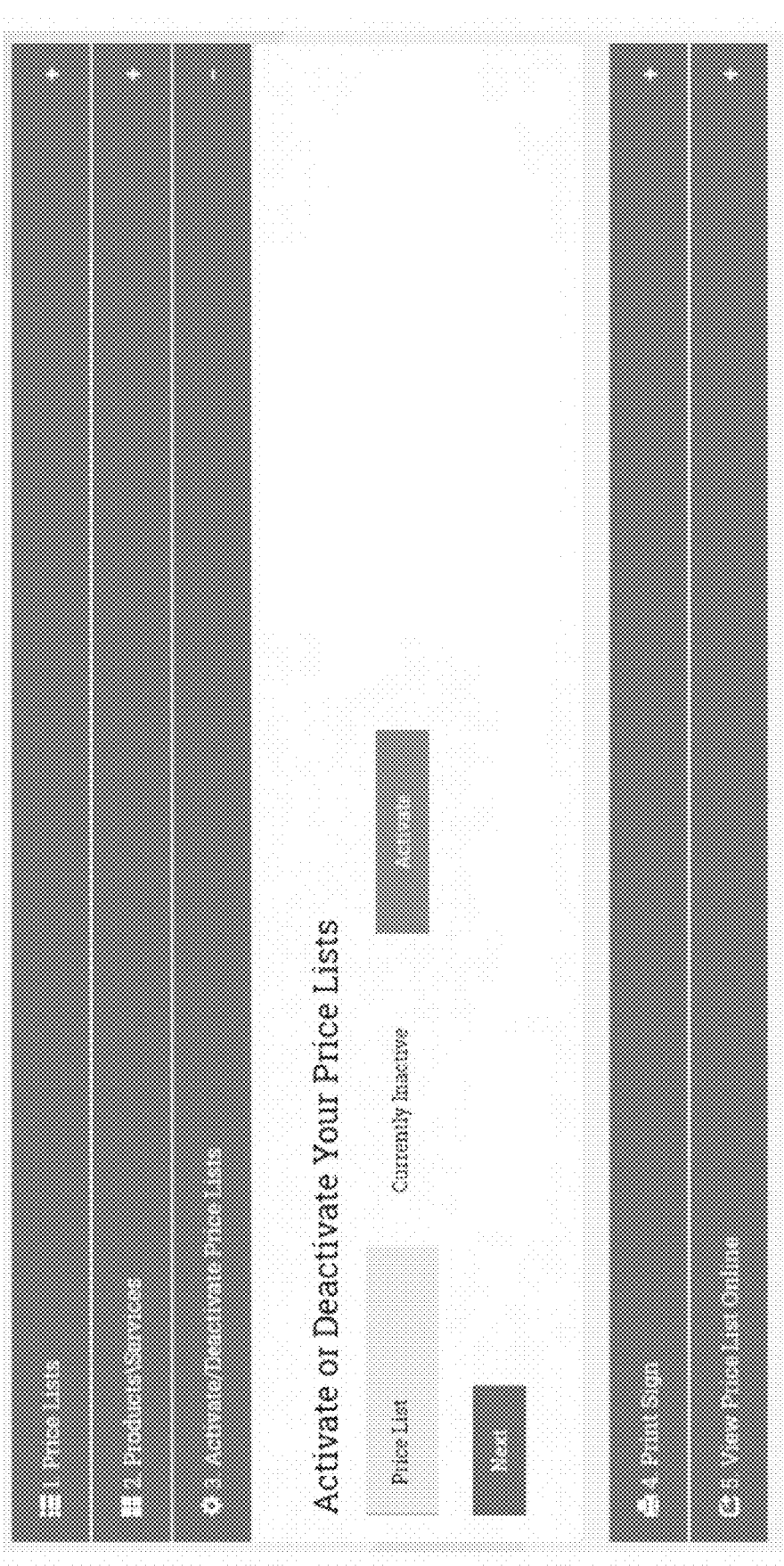
FIG. 7D is a screen shot depicting a price list window showing active and inactive price lists with other elements of a graphical user interface of a dual pricing system.

The third menu item (3) is depicted at FIG. 7D. In one embodiment, the GUI for the activating or deactivating a price list includes a "price list" dialog box indicting the name of the currently buffered price list; an indicator window showing whether the currently buffered price list is "currently active" or "currently inactive;" a button for enabling the user to "activate" a currently inactive price list, or "inactivate" a currently active price list; and a "next" button to enable the user to advance to the next screen (4) of the GUI.

Figure 7E:
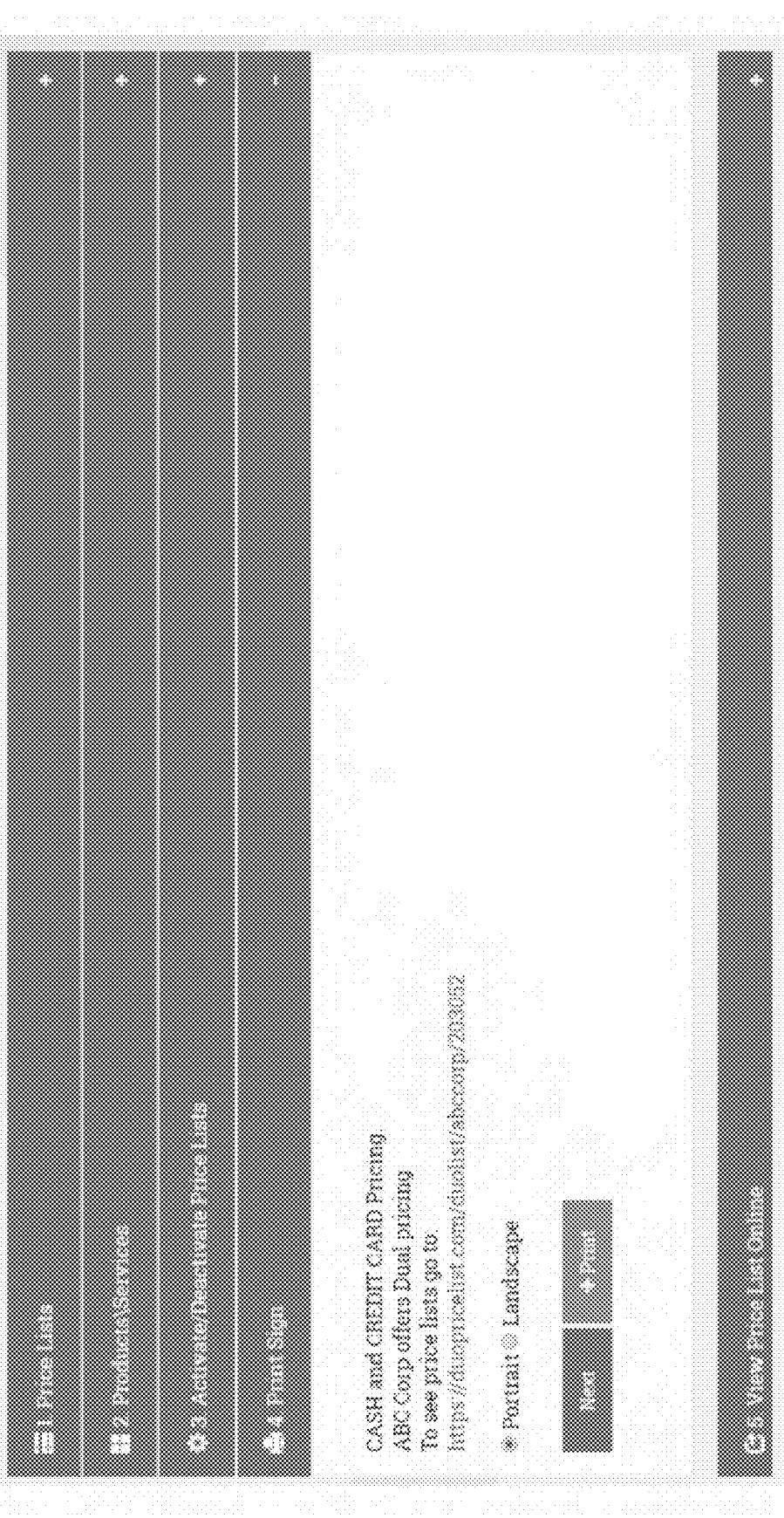
FIG. 7E is a screen shot depicting a signature page and price list set options with other elements of a graphical user interface of a dual pricing system.

The fourth menu item (4) is depicted at FIG. 7E. In one embodiment, the GUI for the printing or authorizing a price list or price sheet includes a narrative display showing the URL of the current price lists for the merchant; a point select option for displaying or printing a document that includes the listed or captioned price lists for the merchant either in portrait or landscape orientation; a "next" button to enable the user to advance to the next screen (5) of the GUI; and a "print" button to enable the user merchant to print the document.

Figure 7F:
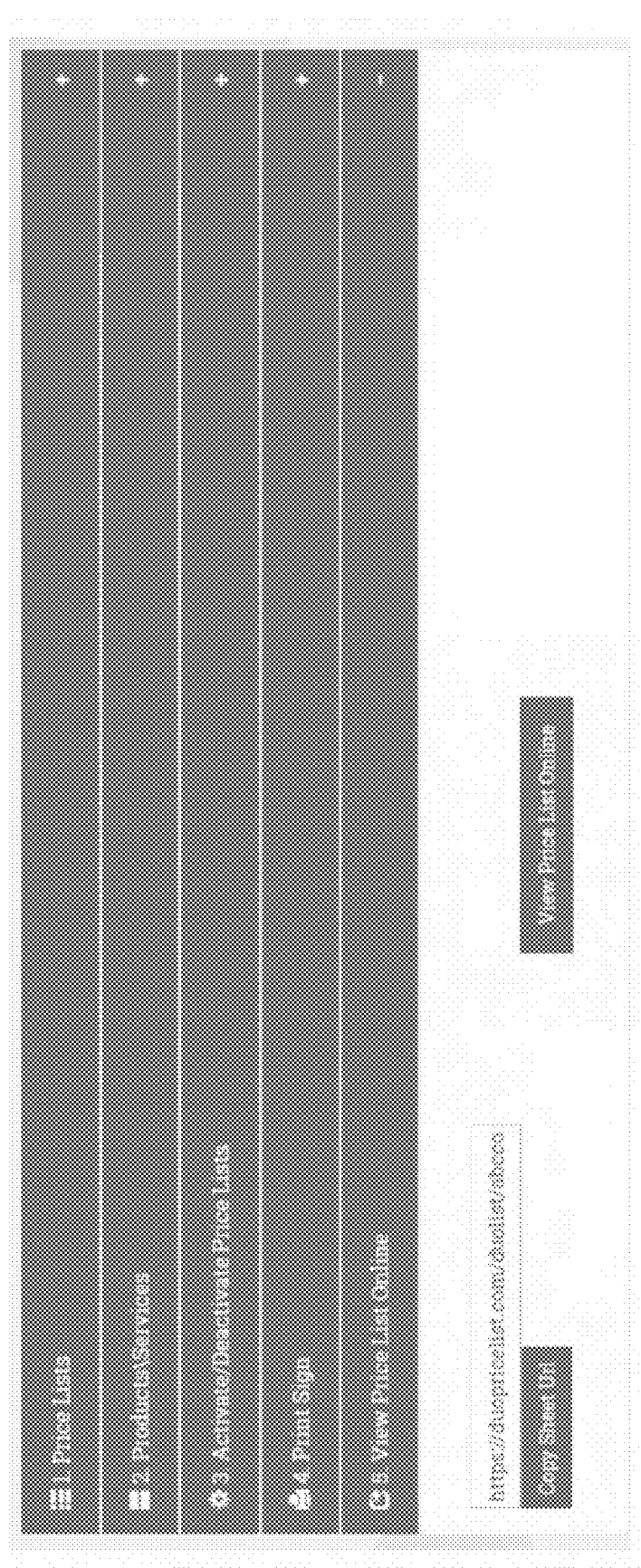
FIG. 7F is a screen shot depicting the URL and online view options for a price list set with other elements of a graphical user interface of a dual pricing system.

The fifth menu item (5) is depicted at FIG. 7F. In one embodiment, the GUI for the viewing a virtual online copy of a price list includes a window displaying the URL for a merchant price list; a "copy" button to enable the user to copy onto a clipboard the URL of the indicted price list; and a "view online" button to enable the user to view the indicted price list online.

Electronic Systems

In order to provide a context for the various computer-implemented aspects of the invention, the following discussion provides a brief, general description of a suitable computing environment in which the various aspects of the present invention may be implemented. A computing system environment, such as a distributed network system or other, is one example of a suitable computing environment, but is not intended to suggest any limitation as to the scope of use or functionality of the invention. A computing environment may contain any one or combination of components discussed below, and may contain additional components, or some of the illustrated components may be absent. Various embodiments of the invention are operational with numerous general purpose or special purpose computing systems, environments, or configurations. Examples of computing systems, environments, or configurations that may be suitable for use with various embodiments of the invention include, but are not limited to, personal computers, laptop computers, computer servers, computer notebooks, hand-held devices, microprocessor-based systems, multiprocessor systems, TV set-top boxes and devices, programmable consumer electronics, cell phones, personal digital assistants (PDAs), tablets, smart phones, internet enabled watches or other smart watches, touch screen devices, smart TV, internet enabled appliances, internet enabled security systems, internet enabled gaming systems, network PCs, minicomputers, mainframe computers, embedded systems, virtual systems, distributed computing environments, streaming environments, volatile environments, and the like.

Embodiments of the invention may be implemented in the form of computer-executable instructions, such as program code or program modules, being executed by a computer, virtual computer, or computing device. Program code or modules may include programs, objects, components, data elements and structures, routines, subroutines, functions and the like. These are used to perform or implement particular tasks or functions. Embodiments of the invention also may be implemented in distributed computing environments. In such environments, tasks are performed by remote processing devices linked via a communications network or other data transmission medium, and data and program code or modules may be located in both local and remote computer storage media including memory storage devices such as, but not limited to, hard drives, solid state drives (SSD), flash drives, USB drives, optical drives, and internet-based storage (e.g., "cloud" storage).

For example, the system (preferably the central server CPU component of the system) may be configured such that memory will include ROM 1306, RAM 1305, and a storage device 1314. A storage device 1314 may be any conventional computer system storage. Storage devices may include a drum; a (fixed and/or removable) magnetic disk drive; a magneto-optical drive; an optical drive (i.e., Blu-eray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, the electronic system generally requires and makes use of memory.

In one embodiment, a computer system comprises multiple client devices in communication with one or more server devices through or over a network, although in some cases no server device is used. In various embodiments, the network may comprise the Internet, an intranet, Wide Area Network (WAN), or Local Area Network (LAN). It should be noted that many of the methods of the present invention are operable within a single computing device.

A client device may be any type of processor-based platform that is connected to a network and that interacts with one or more application programs. The client devices each comprise a computer-readable medium in the form of volatile and/or nonvolatile memory such as read only memory (ROM) and random access memory (RAM) in communication with a processor. The processor executes computer-executable program instructions stored in memory. Examples of such processors include, but are not limited to, microprocessors, ASICs, and the like.

Client devices may further comprise computer-readable media in communication with the processor, said media storing program code, modules, and instructions that, when executed by the processor, cause the processor to execute the program and perform the steps described herein. Computer readable media can be any available media that can be accessed by computer or computing device and includes both volatile and nonvolatile media, and removable and non-removable media. Computer-readable media may further comprise computer storage media and communication media. Computer storage media comprises media for storage of information, such as computer readable instructions, data, data structures, or program code or modules. Examples of computer-readable media include, but are not limited to, any electronic, optical, magnetic, or other storage or transmission device, a floppy disk, hard disk drive, CD-ROM, DVD, magnetic disk, memory chip, ROM, RAM, EEPROM, flash memory or other memory technology, an ASIC, a configured processor, CDROM, DVD or other optical disk storage, magnetic cassettes, magnetic tape, magnetic disk storage or other magnetic storage devices, or any other medium from which a computer processor can read instructions or that can store desired information. Communication media comprises media that may transmit or carry instructions to a computer, including, but not limited to, a router, private or public network, wired network, direct wired connection, wireless network, other wireless media (such as acoustic, RF, infrared, or the like) or other transmission device or channel. This may include computer readable instructions, data structures, program modules or other data in a modulated data signal such as a carrier wave or other transport mechanism. Said transmission may be wired, wireless, or both. Combinations of any of the above should also be included within the scope of computer readable media. The instructions may comprise code from any computer-programming language, including, for example, C, C++, C#, Visual Basic, Java, PHP, Python, and the like.

Client devices also may comprise a variety of other internal or external components, such as a monitor or display, a keyboard, a mouse, a trackball, a pointing device, touch pad, microphone, joystick, satellite dish, scanner, a disk drive, a CD-ROM or DVD drive, or other input or output devices. These and other devices are typically connected to the processor through a user input interface coupled to the system bus, but may be connected by other interface and bus structures, such as a parallel port, serial port, game port or a universal serial bus (USB). A monitor or other type of display device is typically connected to the system bus via a video interface. In addition to the monitor, client devices may also include other peripheral output devices such as speakers and printer, which may be connected through an output peripheral interface.

Computing and client devices also may include a basic input/output system (BIOS), which contains the basic routines that help to transfer information between elements within a computer, such as during start-up. BIOS typically is stored in ROM. In contrast, RAM typically contains data or program code or modules that are accessible to or presently being operated on by processor, such as, but not limited to, the operating system, application program, and data.

Client devices may operate on any operating system capable of supporting an application of the type disclosed herein. Client devices also may support a browser or browser-enabled application. Examples of client devices include, but are not limited to, personal computers, laptop computers, personal digital assistants, computer notebooks, hand-held devices, cellular phones, mobile phones, smart phones, smart watches, pagers, digital tablets, internet appliances, and other processor-based devices. Users may communicate with each other, and with other systems, networks, and devices, over the network through the respective client devices.

Network interfaces of the system may accept, communicate, and/or connect to a communications network. Through a communications network, the CPU is accessible through remote clients (e.g., computers with web browsers) by users, i.e., customer, merchant, and/or system administrator. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers, architectures may similarly be employed to pool, load balance, and/or otherwise increase the communicative bandwidth required by the system. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces may be used to engage with various communications network types. For example, multiple network interfaces may be employed to allow for the communication over broadcast, multicast, and/or unicast networks.

The memory (of the CPU or across the distributed network) may contain a collection of program and/or database components and/or data such as, but not limited to: operating system component(s) (operating system); information server component(s) (information server); user interface component(s) (user interface); Web browser component(s) (Web browser); database(s); optional mail server component(s); mail client component(s); and/or the like (i.e., collectively a component collection). These components may be stored and accessed from the storage devices and/or from storage devices accessible through an interface bus. Although non-conventional program components such as those in the component collection, typically, are stored in a local storage device, they may also be loaded and/or stored in memory such as: peripheral devices, RAM, remote storage facilities through a communications network, ROM, various forms of memory, and/or the like.

The operating system component of the system, distributed network, or CPU is an executable program component facilitating the operation of the system. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the CPU (e.g., central server CPU 310 to communicate with other entities through a communications network. Various communication protocols may be used by the system controller (e.g., located on the central server CPU 310) as a subcarrier transport mechanism for interaction, such as, but not limited to: multicast, TCP/IP, UDP, unicast, and/or the like.

An information server component is a stored program component that is executed by the CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers and allows for the manipulated generation of the Web pages through interaction with other program components. After a Domain Name System (DNS) resolution portion of an HTTP request is resolved to a particular information server, the information server resolves requests for information at specified locations on the DTEC controller based on the remainder of the HTTP request. For example, a request such as http:// 123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the product listing and rates database, operating systems, other program components, user interfaces, Web browsers, and/or the like.

Components of a general purpose client or computing device may further include a system bus that connects various system components, including the memory and processor. A system bus may be any of several types of bus structures, including, but not limited to, a memory bus or memory controller, a peripheral bus, and a local bus using any of a variety of bus architectures. Such architectures include, but are not limited to, Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention and various features thereof.

Having thus described the invention, what is claimed as new and desired to be secured by Letters Patent is:

1. A dual pricing system comprising:
a system processor;
a database connected to said system processor via a communications network and configured for storing price information for a plurality of products and one or more pricing compliance rules;

a software application configured to run on said system processor, the software application comprising a computational algorithm configured for calculating a second price for each product of said plurality of products prior to commencement of a consumer transaction, said algorithm comprising a first variable consisting of a rate factor and a second variable consisting of a first price, and wherein said software application is configured such that a user selects between said first price and said second price for a product for completion of said consumer transaction;
wherein said algorithm is further configured to verify the calculation of said second price against said one or more rules to check for compliance;
wherein said one or more rules comprises one or more rules proscribing a merchant from adding credit card fees at a point of purchase;
a display connected to said system processor and configured for providing access to said user via a user interface;
wherein said user interface is configured for displaying said first price and said second price and for allowing said user to select between said first price and said second price for payment to complete said consumer transaction.

2. The system of claim 1, wherein:
said display comprises a first display and said user interface comprises a first user interface; and
the system further comprises a second display connected to said system processor and configured for providing access to said system via a second user interface.

3. The system of claim 2, wherein:
said first user interface comprises a merchant or consumer user interface; and
said second user interface comprises a system administrator user interface.

4. The system of claim 1, further comprising:
a printer;
a product label comprising a price listing, an electronic link, a web address, a barcode, an RFID, or a quick response (QR) code configured to display or prompt display of the first price and the second price; and
a point of sale (POS) device.

5. The system of claim 4, wherein:
said display is connected to said POS device.

6. The system of claim 1, wherein:
said software application is further configured to display a notification warning on said user interface if said second price is non-compliant with said one or more rules.

7. The system of claim 1, wherein:
said software application is further configured to prompt said user to adjust said first variable to bring said second price in compliance with said one or more rules.

8. The system of claim 1, wherein:
said software application is configured to repeatedly verify the calculation of said second price against said one or more rules to check for compliance until said second price is compliant with said one or more rules.

9. The system of claim 1, wherein:
said software application is further configured to automatically adjust said first variable to make said second price compliant with said one or more rules if said second price is not initially compliant with said one or more rules.

10. The system of claim 1, wherein:

said first price comprises a standard price used for credit card purchases.

11. The system of claim 1, wherein:

said second price comprises a discounted price used for cash purchases.

12. A method of generating two prices for one or more products, the method comprising:

providing a system processor and a database connected to said system processor via a communications network, the database configured for storing price information for said one or more products and one or more pricing compliance rules;

providing a software application configured to run on said system processor, the software application comprising a computational algorithm configured for calculating a second price for the one or more products, said algorithm comprising a first variable consisting of a rate factor and a second variable consisting of a first price, and the software application further configured to verify the calculation of said second price against said one or more rules to check for compliance, wherein said one or more rules comprises one or more rules proscribing a merchant from adding credit card fees at a point of purchase;

setting said first price variable and generating said second price for said one or more products prior to commencement of a consumer transaction;

verifying said second price for compliance with said one or more rules;

displaying a user interface showing said first price and said second price for said one or more products; and a user selecting between said first price and said second price for payment to complete said consumer transaction.

13. The method of claim 12, further comprising:

printing a product label comprising a price listing, an electronic link, a web address, a barcode, an RFID, or a quick response (QR) code configured to display or prompt display of the first price and the second price.

14. The method of claim 12, further comprising:

a point of sale (POS) device processing said consumer transaction following said user selection between said first price and said second price.

15. The method of claim 12, further comprising:

displaying a notification warning on said user interface when said second price is non-compliant with said one or more rules.

16. The method of claim 12, further comprising:

prompting said user to adjust said first variable to bring said second price in compliance with said one or more rules.

17. The method of claim 12, further comprising:

repeatedly verifying said second price for compliance with said one or more rules until said second price is compliant with said one or more rules.

18. The method of claim 12, further comprising:

automatically adjusting said first variable to make said second price compliant with said one or more rules if said second price is not initially compliant with said one or more rules.

\*    \*    \*    \*    \*